United States Patent [19]

Quinn

[11] Patent Number: 5,056,258
[45] Date of Patent: Oct. 15, 1991

[54] TREE TRUNK SMOOTHING DEVICE

[75] Inventor: Robert V. Quinn, Glendora, Calif.

[73] Assignee: John W. Wootton, Glendora, Calif.; a part interest

[21] Appl. No.: 384,549

[22] Filed: Jul. 24, 1989

Related U.S. Application Data

[63] Continuation-in-part of Ser. No. 29,736, Mar. 24, 1987.

[51] Int. Cl.[5] .............................................. A01G 1/04
[52] U.S. Cl. .......................................... 47/1.01; 47/8; 144/208 K; 144/2 Z
[58] Field of Search .................. 144/208 K, 2 Z; 47/1.01, 8; 30/383, 379

[56] References Cited

U.S. PATENT DOCUMENTS

| | | | |
|---|---|---|---|
| 2,477,922 | 8/1949 | Emery . | |
| 2,482,392 | 9/1949 | Whitaker | 47/1.01 |
| 2,534,595 | 12/1950 | Hamilton | 47/1.01 |
| 2,541,767 | 2/1951 | Jones | 47/1.01 |
| 2,581,479 | 1/1952 | Grasham | 47/1.01 |
| 2,727,335 | 12/1955 | Susil | 47/1.01 |
| 2,871,620 | 2/1959 | Bathe | 144/208 K X |
| 3,117,401 | 1/1964 | Talley . | |
| 3,545,509 | 12/1970 | Baxter | 144/208 K X |
| 4,355,672 | 10/1982 | von Gaertringen . | |
| 4,633,925 | 1/1987 | Yasunaga | 144/2 Z X |

Primary Examiner—David A. Scherbel
Assistant Examiner—Linda J. Watson
Attorney, Agent, or Firm—Christie, Parker & Hale

[57] ABSTRACT

A device is set forth for trimming branch and frond segments from trees which includes a frame positionable about the trunk and a mechanism disposed on the frame for driving the frame upwardly and downwardly along the trunk. A carriage is carried by the frame and encircles the trunk. Trimming blades are mounted on the carriage in a chordal relationship and are biased to maintain engagement with the trunk. As the frame is driven upwardly, a motor rotates the carriage causing the blades to remove the branch and frond segments from the tree.

5 Claims, 8 Drawing Sheets

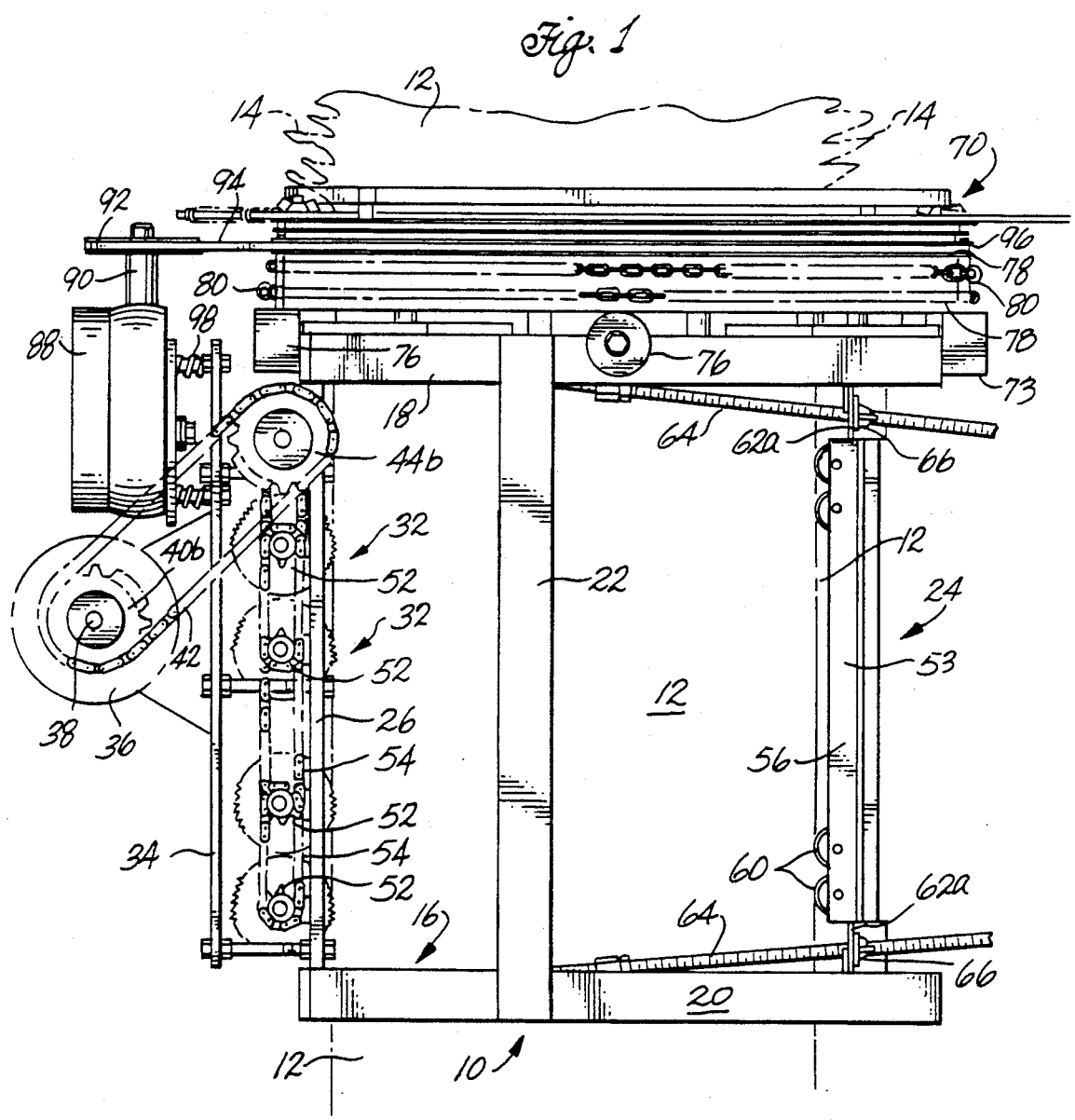

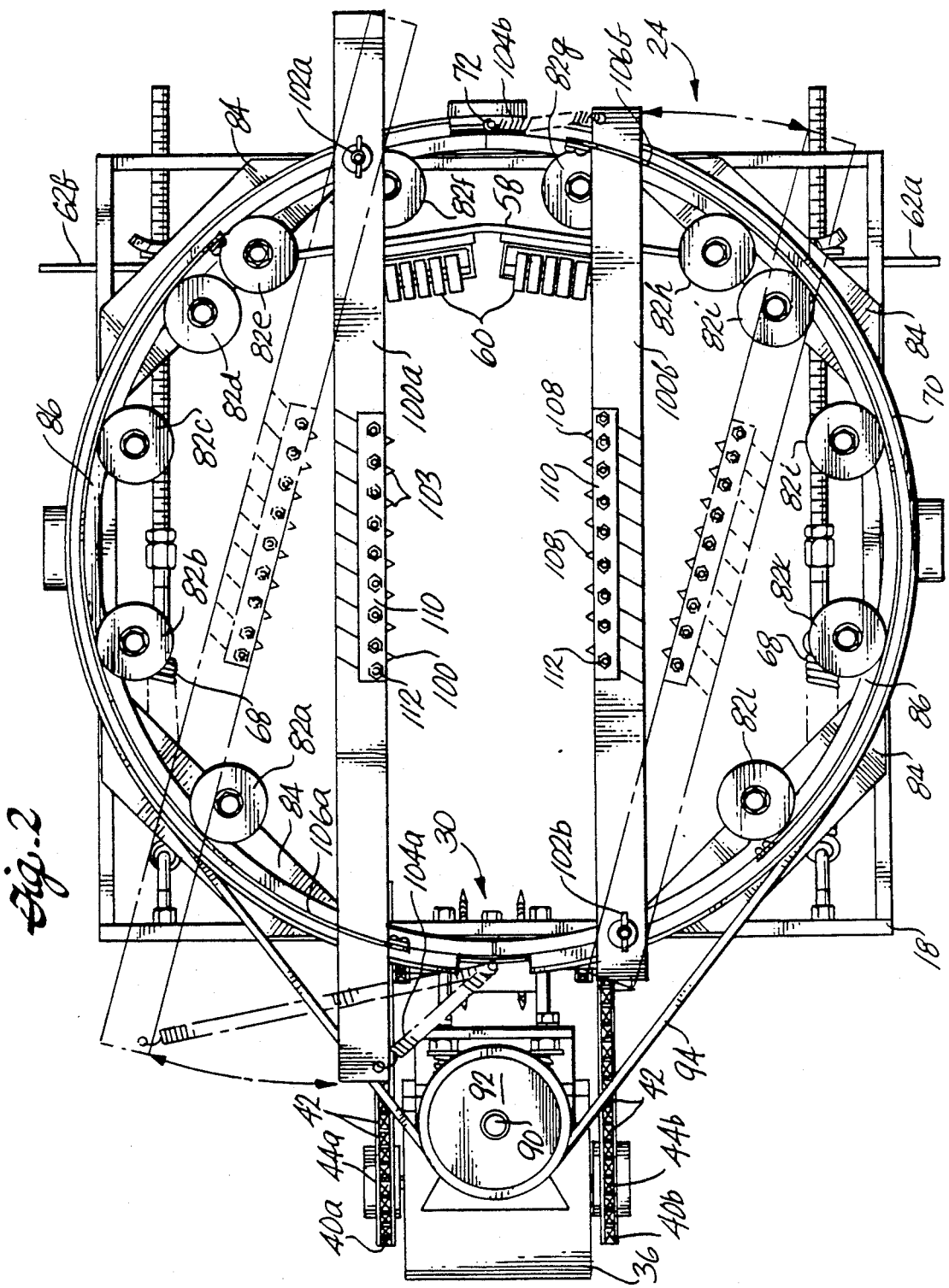

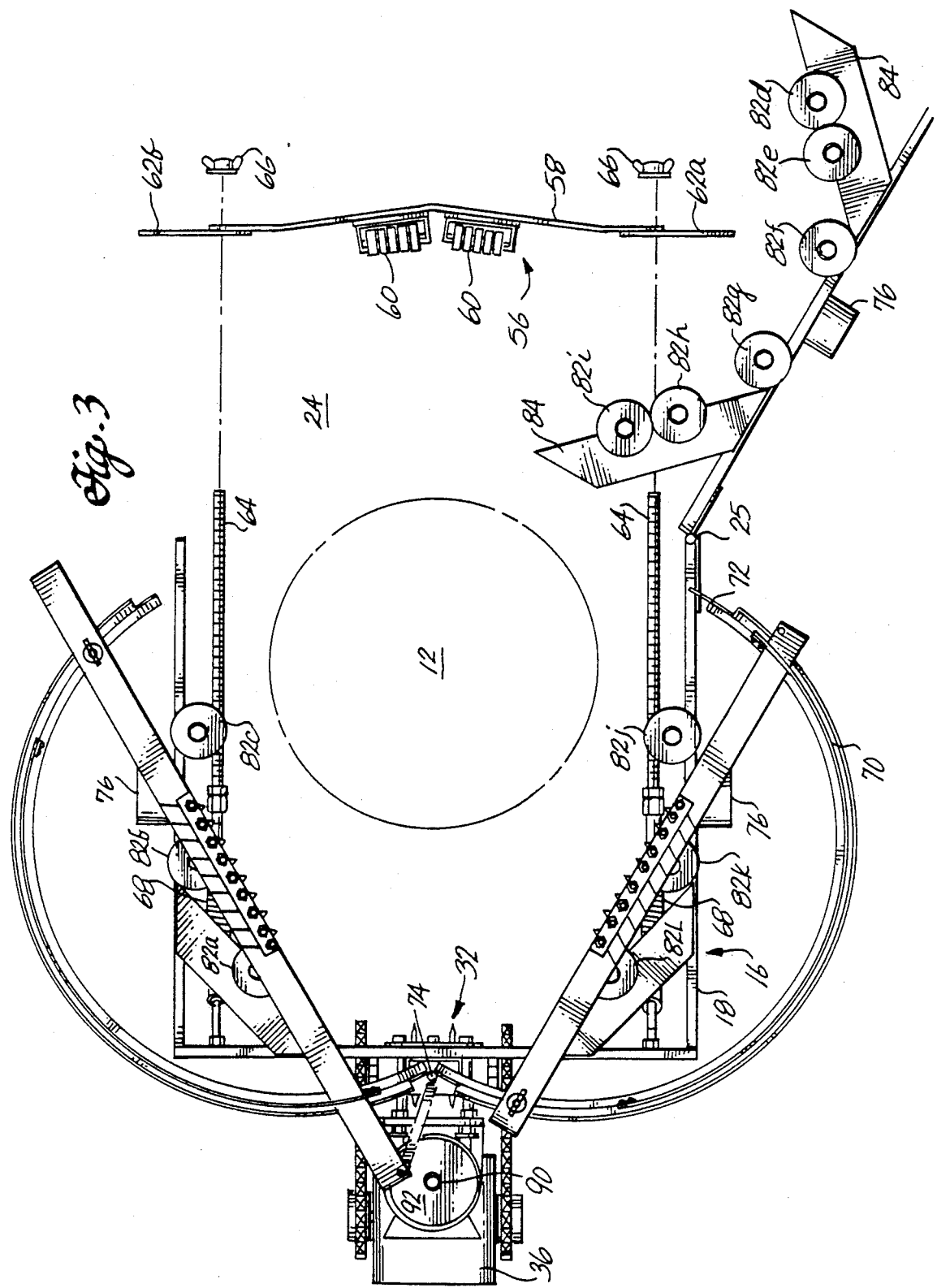

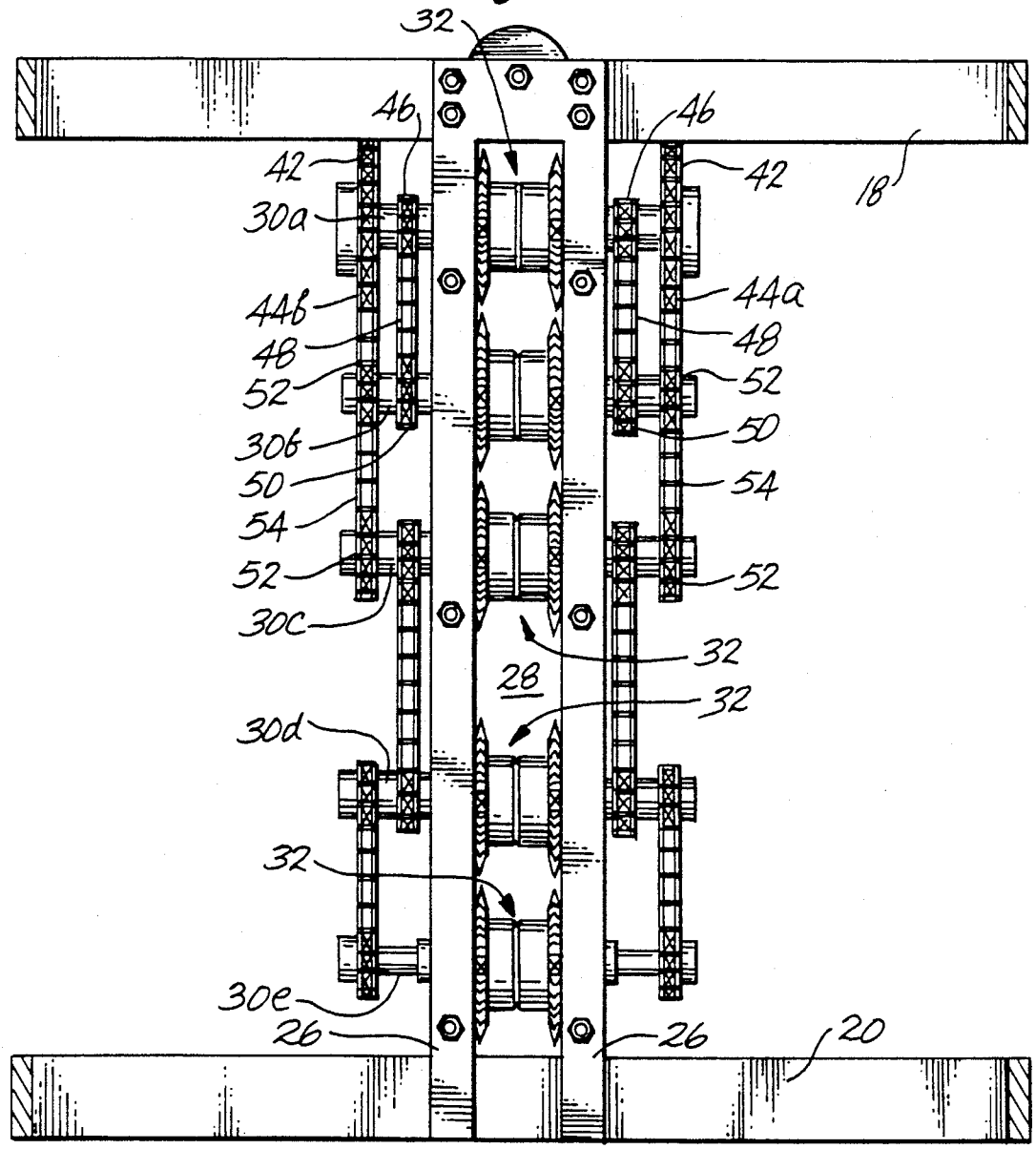

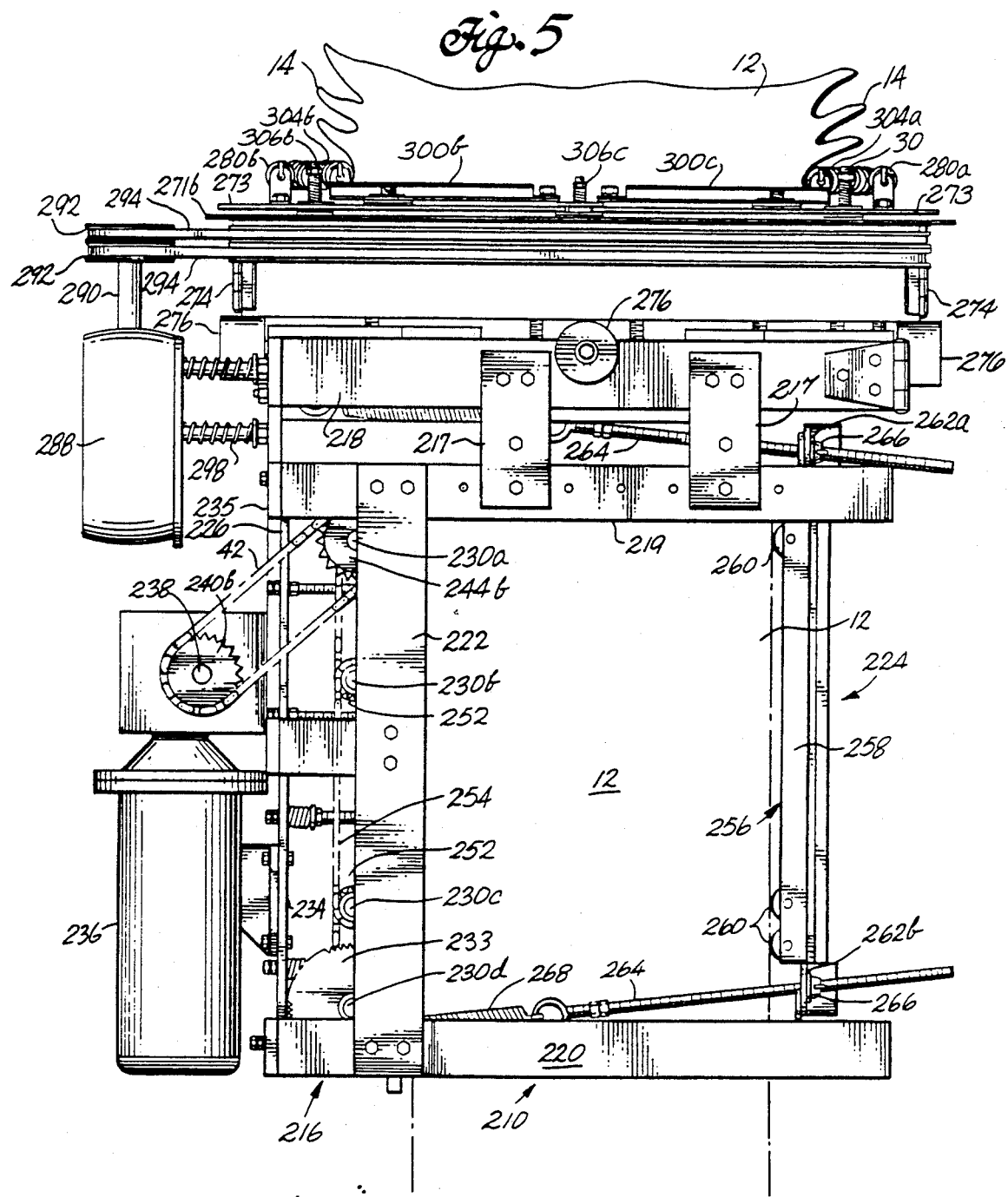

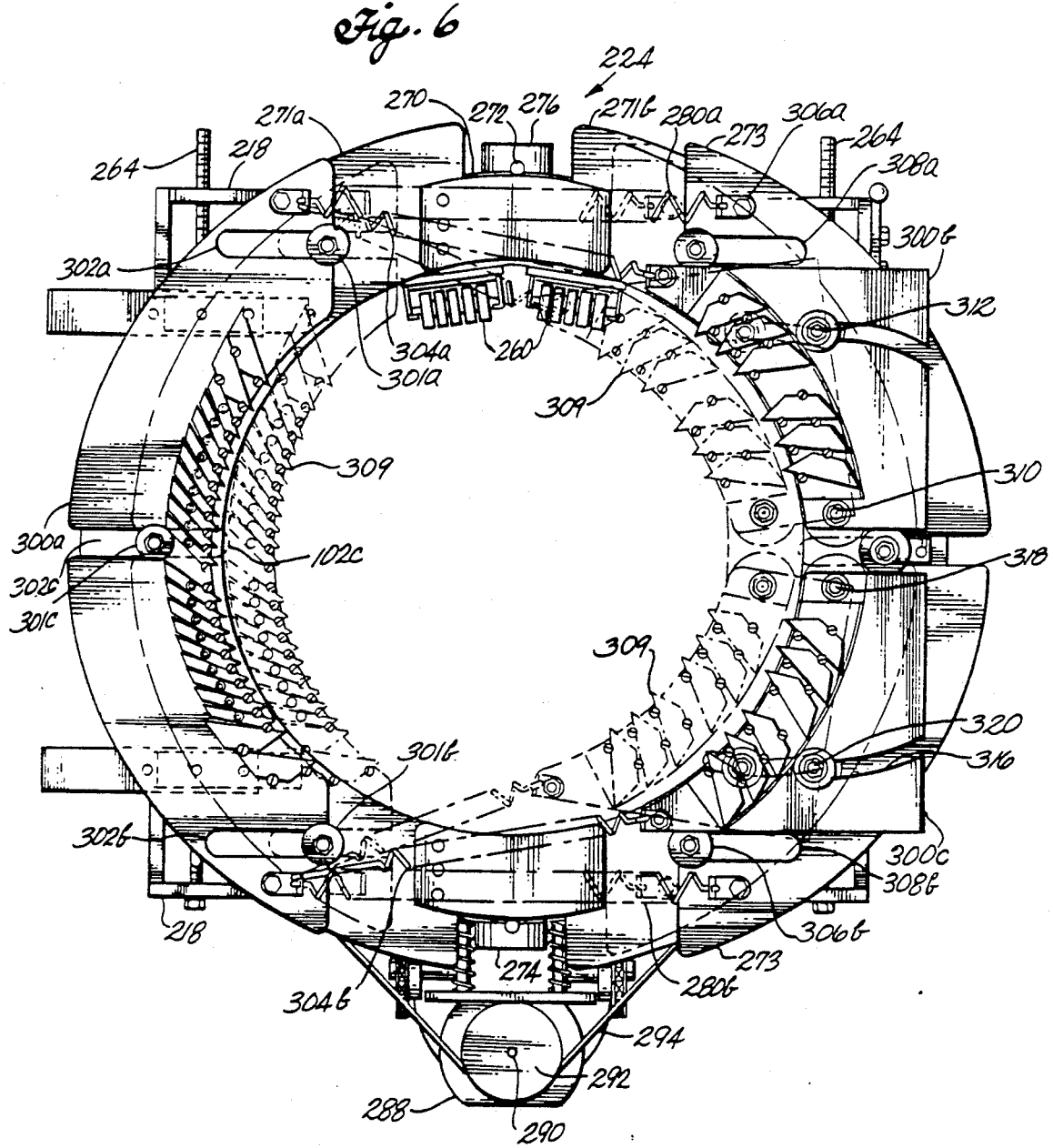

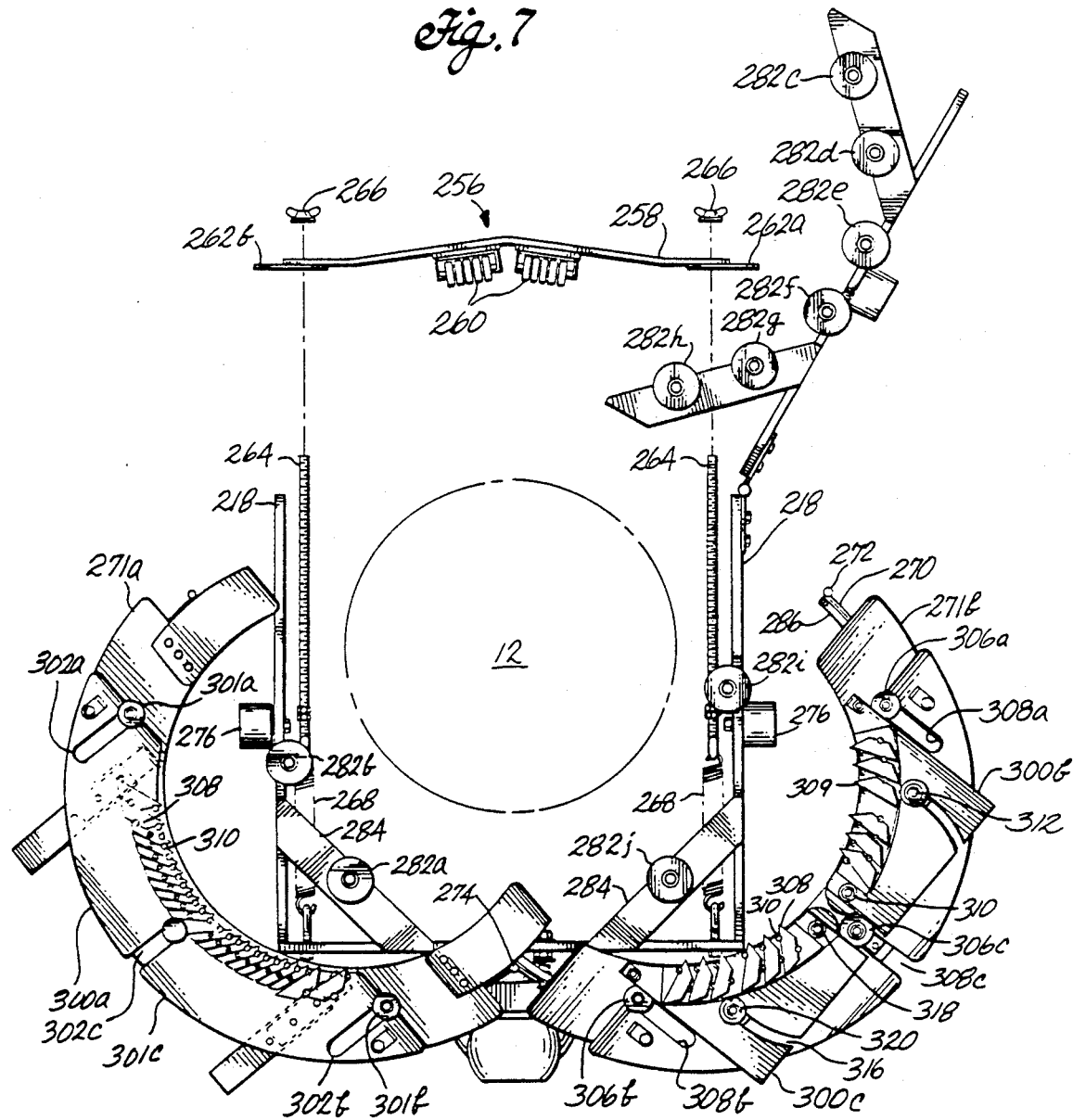

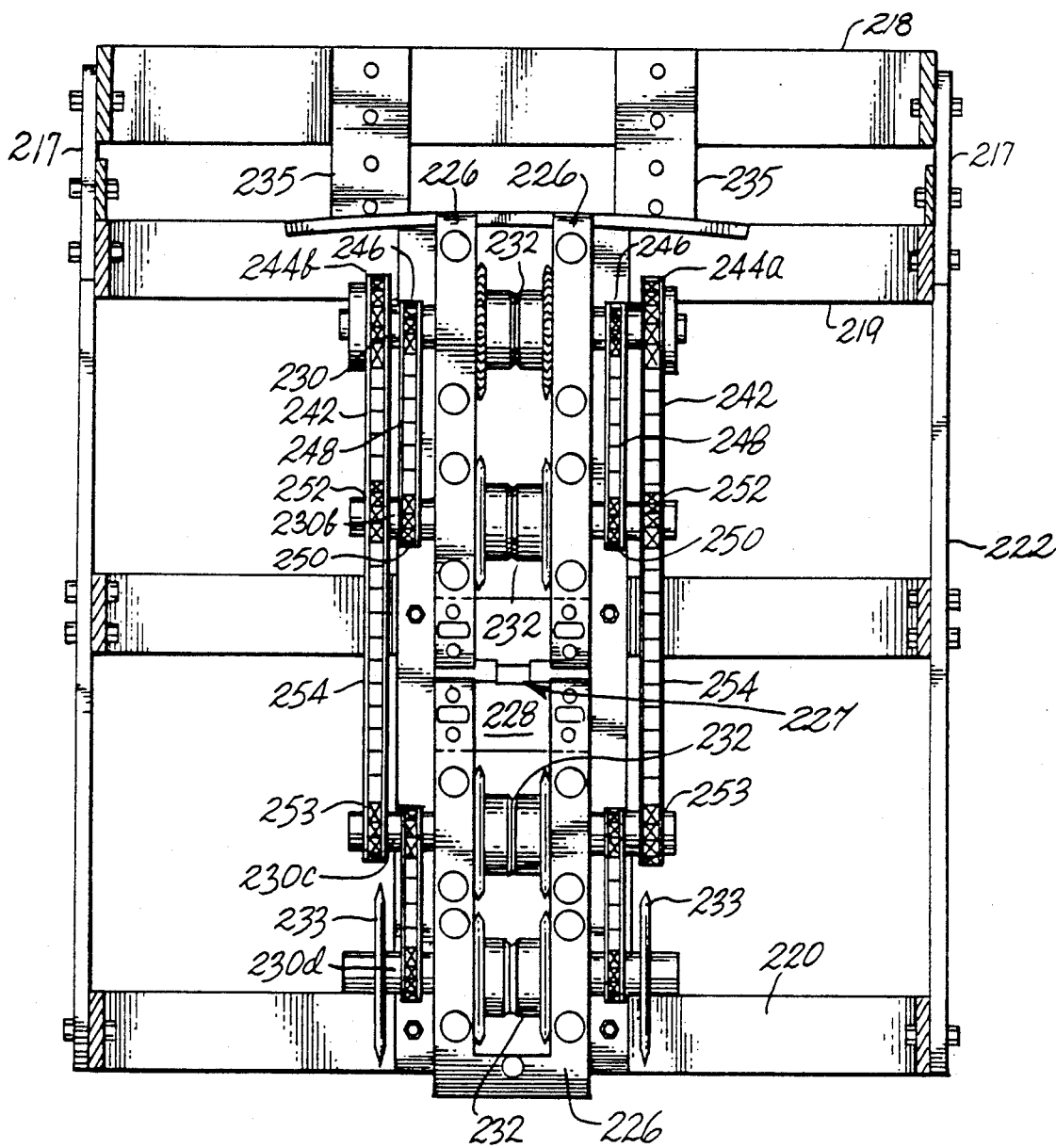

TREE TRUNK SMOOTHING DEVICE

RELATED APPLICATION

This application is a continuation-in-part of U.S. patent application Ser. No. 07/029,736 filed Mar. 24, 1987.

FIELD OF THE INVENTION

This invention relates to devices for smoothing the trunks of trees after the blades, fronds, etc. have been removed.

BACKGROUND OF THE INVENTION

As trees such as palm trees grow, new fronds sprout at the top and old fronds wither and die. When old fronds die and are cut off, this results in dead frond segments, hereinafter called "collars" or "frond segments", remaining on the trunk presenting an unsightly appearance and an inviting nest for insects and rodents. Dirt and detritus also tend to collect at the collar cluster. In the past, it has been the practice to manually trim the collars close to the trunk from palm tree trunks to enhance the beauty of the tree and prevent the occurrence of the above problems.

Manual removal of collars is slow, tedious work and, due to the heights involved, also presents a safety risk. It has also been known to construct devices for trimming the old fronds from trees. Susil, U.S. Pat. No. 2,727,335, discloses such a device. Such prior devices however are not designed to remove collars from the trunks of trees to provide a smooth trunk and branch segments. There are also other considerations. Trees vary from tree to tree in diameter. An ability to conform to the changing girth of a tree in as simple a device as possible to enhance its reliability and performance is highly desirable.

SUMMARY OF THE INVENTION

Toward this end, the present invention provides an apparatus for trimming collars or frond segments from palm trees which is simple in design and adjusts to the changing or different girth of palm trees to neatly trim the collars and smooth the trunk over the entire height of the tree.

Accordingly, a device for trimming the collars and smoothing palm tree trunks is set forth which includes an articulated frame positionable about the base of the palm tree trunk. Means are disposed on the frame for engaging the trunk and driving the frame upwardly and downwardly therealong. Preferably, the driving means are embodied as a plurality of driven wheels at one side of the frame which engage with and track against the trunk. Opposite the wheels are means for urging the wheels to maintain said traction with the trunk. Biased springs interacting between roller sets bearing against the tree trunk opposite the wheels may comprise the aforesaid urging means.

A carriage is mounted on the frame to encircle the trunk when the frame is so positioned. Suitable means such as an electric motor on the frame are coupled to and rotate the carriage circumferentially about the trunk. Trimming means for removing collars and smoothing the trunk including a plurality of blade members disposed on the carriage in an opposed relationship are resiliently biased into engagement with the trunk to maintain the trunk trapped therebetween. As the carriage rotates so do the blade members to trim collars from the trunk. Operating the driving means causes the device to climb or descend on the trunk, removing collars along its length as it moves up or down. The biased blade members maintain cutting contact with the tree even though the girth of the trunk may change.

The device according to the present invention exhibits several features and advantages. Firstly, the device is of simple construction and does not require complicated hydraulics or other driving means. Further, despite its simplicity, the device is suited to remove collars from palm trees of various girths and even those wherein the girth changes over the height of the tree. The blade members are continually urged to trap the trunk therebetween and, as the carriage is rotated, trim the collars therefrom.

BRIEF DESCRIPTION OF THE DRAWINGS

These and other features and advantages will become appreciated as the same becomes better understood with reference to the specification, claims and drawings wherein:

FIG. 1 is a side view of a first embodiment of the present invention attached to a palm tree trunk shown in phantom;

FIG. 2 is a top view of the first embodiment illustrating the blade members and carriage;

FIG. 3 is a top view of the first embodiment shown open for positioning about the trunk of a tree; and FIG. 4 is an elevation view of the driving means for moving the first embodiment upwardly and downwardly along the trunk of the tree.

FIG. 5 is a side view of a second embodiment of the present invention attached to a palm tree trunk shown in phantom;

FIG. 6 is a top view of the second embodiment illustrating the blade members and carriage;

FIG. 7 is a top view of the second embodiment shown open for positioning about the trunk of a tree; and FIG. 8 is an elevation view of the driving means for moving the second embodiment upwardly and downwardly along the trunk of the tree.

DETAILED DESCRIPTION OF THE INVENTION

Turning to the drawings, FIGS. 1-4 show a first embodiment of the device 10 according to the present invention attached to the trunk 12 of a palm tree to trim collars 14 therefrom. As indicated, the device 10 is attached to the base of trunk 12 and is operated to climb the trunk 12 and trim frond segments 14 therefrom. When trimming is complete, the device 10 is operated to descend the trunk of the tree and is thereafter removed from the tree.

The device 10 has a frame 16 which may be parallelepipedal in configuration and of a size to encircle the trunk 12 of the tree. Frame 16 has rectangular top and bottom supports 18 and 20, respectively, spaced apart and held rigid by vertically arranged braces 22. At one side thereof shown as 24 in FIGS. 1, 2 and 3, the frame 16 is adapted to be partially disassembled to permit the frame to be positioned about the trunk 12. Once positioned, the disassembled components of the frame 16 are reassembled into the configuration shown in the drawings about the trunk 12. The aforementioned disassembling means may include a hinge 74 and suitable fasteners (not shown), such as nuts and bolts.

Disposed on the frame are means for driving the device 10 to climb and descend trunk 12. For this purpose, the frame 16 includes, opposite side 24, vertical, parallel, spaced support bars 26 defining therebetween a channel 28 as best shown in FIG. 4. Journaled at the outside of bars 26 are a plurality of horizontally arranged axles 30a–e, each of which mounts toothed wheel pairs 32 protruding through the channel 28 into the region defined by the frame. Wheel pairs 32 are adapted to engage and maintain traction with the trunk 12.

Mounted to the outside of the frame 16 is a mounting plate 34 which mounts the means for driving the wheel pairs 32 to cause the device 10 to climb and descend the trunk 12. Attached to plate 34 is an electric motor 36 having a double output shaft 38 mounting a pair of drive sprockets 40a–b at its ends. Drive sprockets 40a, 40b, drive chains 42 which engage and drive a pair of driven sprockets 44a, 44b, respectively, affixed to the distal ends of axle 30a. Accordingly, operation of the motor 36 in a forward or reverse direction drives the chains and sprockets and causes axle 30a to rotate its wheel pair 32 in a corresponding direction.

To drive the remaining axles, axle 30a further includes a pair of secondary sprockets 46 which drive chains 48 which, in turn, intermesh with and drive secondary sprockets 50 keyed to axle 30b. Accordingly, as axle 30a drives chains 48, the aforementioned secondary sprockets 50 cause axle 30b to be driven to rotate. Rotation of axle 30b causes its wheel pairs 32 to also rotate in synchronism with the wheel pair for axle 30a. Axle 30b also mounts tertiary sprockets 52 which drive chains 54 and through the chains 54 drives sprockets 52 on axle 30c. As with axle 30b, via the chain and sprocket arrangement, axles 30c and likewise axles 30d, 30e, are caused to rotate with axle 30a, thereby driving all wheel pairs 32 in synchronism. The end result is that as motor 36 is driven either forward or reversely, the wheel pairs 32 are caused to also rotate forward or reversely to cause device 10 to climb or descend the trunk 12.

To maintain the wheel pairs 32 and the teeth thereof in engagement with the trunk 12, the device 10 also includes urging means for exerting a resilient bias on the drive means producing engagement between the trunk and the drive means. These urging means include a roller set 56 having a sub-frame 58 which is disposed between and movable relative to top and bottom supports 18, 20. As shown with reference to FIGS. 1, 2 and 3, roller set 56 includes eight rollers 60 disposed at each end of sub-frame 58 in sets of four each. The rollers 60 are angled toward each other from the mid plane of sub-frame 58 to engage and mate with the curvature of trunk 12. Sub-frame 58 is angled as best shown in FIG. 3 to accommodate the canting of rollers 60. At each end, sub-frame 58 includes horizontally extending arms 62a, 62b, the ends of which each mount threaded rods 64. The four rods 64 are held against arms 62a, 62b by wing nuts 66. Opposite sub-frame 58, the ends of the rods 64 are, as shown in FIGS. 2 and 3, attached to biasing means shown as coil springs 68. These springs are attached to their respective top or bottom supports 18, 20. As can be appreciated, by adjusting wing nuts 66 the position of sub-frame 58 can be adjusted to bring the rollers 60 to bear against the trunk 12 and by virtue of the biasing of the springs and rods, to urge wheel pairs 32 into and maintain engagement with trunk 12. Due to the biasing of springs 68, the frame 16 and wheel pairs 32 are drawn into and maintain traction against the trunk 12. Accordingly, as the motor 36 is driven, the driving means including wheel pairs 32 engage and maintain traction with the trunk to drive the device 10 upwardly and downwardly along the trunk 12 as further guided by rollers 60.

Supported at the top support 18 for rotation is a circular carriage 70 which like the frame 16 is adapted to encircle trunk 12. At a pin 72, the carriage 70 can be released and opened pivoting about hinge 74 to receive trunk 12 therein, as shown in FIG. 3. When the frame 16 has been positioned about the trunk 12, carriage 70 is also reconnected so as to encircle trunk 12.

When the carriage 70 is reconnected into its circular configuration as shown in FIG. 2, chain retainers are wrapped about the perimeter of the carriage 70, with the ends of each retainer 78 being connected by a tension spring 80. Springs 80 and chain retainer 78 maintain the carriage 70 in the closed position as shown in FIG. 2 during operation of the device 10.

The carriage 70 rests on wheels 76 journaled at quarter points on the top support 18. The carriage 70, when rotated as described below, rotates the top of the wheels 76.

To further guide and support the carriage 70 for rotation, the device 10 includes guide wheels 82 distributed so as to bear against the inside surface of the carriage 70 as shown in FIG. 2. Certain of the guide wheels shown as guide wheels 82b, 83c, 82f, 82g, 82j, 82k, are connected to the top support 18 whereas guide wheels 82a, 82d, 82e, 82h, 82i, 82l, are connected to corner supports 84 disposed across top support 18 at the corners thereof. As stated above, the guide rollers 82a–l bear against the inside surface of the carriage 70 to guide and support its rotation and prevent forward-to-rear or side-to-side translation during the operation of the device 10. As best shown in FIG. 2, carriage 70 includes an annular lip 86 which is disposed axially below the guide wheels 82a–l, and engages the same to prevent upward movement of the carriage 70 relative to the frame 16. As described above, downward relative movement is prevented by the wheels 76. As can be appreciated, the wheels 76 and guide wheels 82a–l, guide and journal the carriage for rotation about the trunk 12 of the tree.

To rotate the carriage 70, plate 34 mounts electric motor 88 which may be of any suitable type, including a heavy duty electric motor. Motor 88 has a shaft 90 to which is keyed at least one sheave 92. Sheave 92 engages a belt 94 which is wrapped about the carriage 70 and received at an appropriate track 96 thereof as indicated in FIG. 1. Accordingly, when the motor 88 is energized, the sheave 92 rotates driving the belt 94 which, in turn, rotates the carriage 70. Track 96 retains the belt 94 in proper alignment and coupled with the carriage 70 during the drive rotation thereof. Guide wheels 82a–l support the carriage 70 to permit the endless belt 94 to be tensioned. To adjust the tension of the belt 94, motor 88 may be mounted on adjustable mounts 98 to permit its adjustable movement toward and away from plate 34.

To trim the frond segments 14 from the tree as a result of the rotation of the carriage 70, a pair of blade members 100a, 100b are pivotally attached to the carriage 70 generally horizontally with respect to the vertical tree 12. As shown, blade member 100a is attached to carriage 70 at a pivot 102a, disposed at a location on the carriage 70. From pivot 102a, blade member 100a extends in a chordal direction across the carriage 70 and beyond the perimeter thereof. At the end of blade member 100a, biasing means shown as spring 104a is interconnected between blade member 100a and carriage 70 to provide a bias against the outward pivotal motion of blade member 100a as indicated in FIG. 2. That is, spring 104a urges blade member 100a to pivot toward the center of carriage 70.

To guide blade member 100a, carriage 70 has an arcuate guide 106a disposed to be partially coextensive with the perimeter of carriage 70 and having a slot to pass blade member 100a. The slot of guide 106a terminates to retain the blade member against the bias of spring 104a in a position at which it has a maximum chord length and defining the minimum diameter of tree which the device 10 can accommodate. The slot of guide 106 continues in a direction away from spring 104a to the opposite terminus thereof which restrains the blade member 100a from further pivot and defines the maximum diameter of tree trunk which can be accommodated by the device 10. The degree of pivot of blade member 100a as accommodated by the guide 106 is indicated in FIG. 2.

To define cutting edges for blade member 100a, a plurality of blades 108 are mounted thereon medially of blade member 100a. An adjusting bar 110 secured by bolts 112 to blade member 100a provides for adjustment and replacement of blades 108.

Blade member 100b is likewise attached by a pivot 102b to carriage 70 at a location diametrically opposite pivot 102a. Blade member 100b extends in a chordal direction across the carriage 70 and is received through a guide 106b similar to and disposed diametrically from guide 106a. Spring 104b biases blade member 100b against outward pivot in the manner as described above with reference to spring 104a. Blades 108 are supported on blade member 100b by an adjusting bar 110 held in place by bolts 112.

As can be appreciated with particular reference to FIG. 2, the blade members 100a, 100b are adapted for movement in the fashion of a parallelogram toward and away from the center of the device 10 and its rotating carriage 70. As carriage 70 rotates, blade members 100a, 100b are free to pivot against the bias of springs 104a, 104b to maintain blades 108 in engagement with the trunk 12 of the tree. As the diameter of the tree changes, blade member 100a, 100b cooperatively pivot accommodating such change to remove the frond segments 14 therefrom.

Based upon the foregoing, the device 10 is initially attached to the trunk 12 of the tree in the manner described above. Wing nuts 66 are adjusted to trap the trunk of the tree between rollers 60 and wheel pairs 32. Motor 36 is energized as is motor 88, causing the device 10 to begin to ascend the tree as carriage 70 rotates. Rotation of carriage 70 causes blades 108 to sever frond segments 14 from the tree as the device 10 progressively moves upwardly along trunk 12. When collars 14 have been severed along the length of the tree, motor 36 is reversely driven so that the device descends to the bottom of the tree where both motors 36, 88 are deenergized and the device 10 is removed from the tree.

FIGS. 5–8 show a second embodiment of the present invention. Turning now to FIG. 5, device 210 is shown attached to the trunk 12 of a palm tree to trim collars 14 therefrom and smooth the trunk 12. As with the first embodiment, the device 210 is attached to the base of trunk 12 and is operated to climb and smooth the trunk 12 and trim collars 14 therefrom. When trimming is complete, the device 210 is operated to descend the trunk of the tree and is thereafter removed from the tree.

The device 210 has a frame 216 which may be parallelepipedal in configuration and of a size to encircle the trunk 12 of the tree. Frame 216 has rectangular upper and lower supports 219 and 220, respectively, spaced apart and held rigid by vertically arranged braces 222. Upper support 219 is spaced apart from top support 218 by vertically arranged braces 217. At one side thereof shown as 224 in FIGS. 5 and 6, the frame 216 is adapted to be partially disassembled to permit the frame to be positioned about the trunk 12. Once positioned, the disassembled components of the frame 216 are reassembled into the configuration shown in the drawings about the trunk 12. The aforementioned disassembling means may include a hinge 274 and suitable fasteners (not shown), such as nuts and bolts.

Disposed on the frame are means for driving the device 210 to climb and descend trunk 12. For this purpose, the frame 216 includes, opposite side 224, vertical, parallel spaced support bars 226, articulated by hinge 227, defining therebetween a channel 228 as best shown in FIG. 8. Journaled at the outside of bars 226 are a plurality of horizontally arranged axles 230a–d, each of which mounts toothed wheel pairs 232 protruding through the channel 228 into the region defined by the frame. Wheel pairs 232 are adapted to engage and maintain traction with the trunk 12.

Mounted to the outside of the frame 216 are mounting plates 234 and 235. Mounting plate 234 mounts the means for driving the wheel pairs 232 to cause the device 210 to climb and descend the trunk 12. Attached to plate 234 is an electric motor 236 having a double output shaft 238 mounting a pair of drive sprockets 240a–b at its ends. Drive sprockets 240a, 240b, drive chains 242 which engage and drive a pair of driven sprockets 244a, 244b, respectively, affixed to the distal ends of axle 230a. Accordingly, operation of the motor 236 in a forward or reverse direction drives the chain and sprockets and causes axle 230a to rotate its wheel pair 232 in a corresponding direction.

Turning now to FIG. 8, to drive the remaining axles, axle 230a further includes a pair of secondary sprockets 246 which drive chains 248 which, in turn, intermesh with and drive secondary sprockets 250 keyed to axle 230b. Accordingly, as axle 230a drives chains 248, the aforementioned secondary sprockets 250 cause axle 230b to be drive to rotate. Rotation of axle 230b causes its wheel pairs 232 to also rotate in synchronism with the wheel pair for axle 230a. Axle 230b also mounts tertiary sprockets 252 which drive chains 254 and through the chains 254 drives sprockets 253 on axle 230c. As with axle 230b, via the chain and sprocket arrangement, axles 230c and likewise axle 230d are caused to rotate with axle 230a, thereby driving all wheel pairs 232 in synchronism. Axle 230d additionally drives wheels 233 which are also adapted to engage and maintain traction with the trunk 12. The end result is that as motor 236 is driven either forward or reversely, the wheel pairs 232 are caused to also rotate forward or reversely to cause device 210 to climb or descend the trunk 12.

Returning to FIG. 5, in order to maintain the wheel pairs 232 and the teeth thereof in engagement with the trunk 12, the device 210 also includes urging means for exerting a resilient bias on the drive means producing engagement between the trunk and the drive means.

These urging means include a roller set 256 having a sub-frame 258 which is disposed between and movable relative to top and lower supports 219, 220. As shown with reference to FIGS. 5 and 6, roller set 256 includes eight rollers 260 disposed at each end of sub-frame 258 in sets of four each. The rollers 260 are angled toward each other from the mid-plane of sub-frame 258 to engage and mate with the curvature of trunk 12. Sub-frame 258 is angled as best shown in FIG. 7 to accommodate the canting of rollers 260. At each end, sub-frame 258 includes horizontally extending arms 262a, 262b, the ends of which each mount threaded rods 264. The four rods 264 are held against arms 262a, 262b by wing nuts 266. Opposite sub-frame 258, the ends of the rods 264 are, as shown in FIG. 7, attached to biasing means shown as coil springs 268. These springs are attached to their respective upper and lower supports 219 and 220. By adjusting wing nuts 266, the position of sub-frame 258 can be adjusted to bring the rollers 260 to bear against the trunk 12 and by virtue of the biasing of the springs and rods, to urge wheel pairs 232 and wheels 233 into and maintain engagement with trunk 12. Due to the biasing of springs 268, the frame 216, wheel pairs 32 and wheels 233 are drawn into and maintain traction against the trunk 12. Accordingly, as the motor 236 is driven, the driving means including wheel pairs 232 and wheels 233 engage and maintain traction with the trunk to drive the device 210 upwardly and downwardly along the trunk 12 as further guided by rollers 260.

Supported at the top support 218 for rotation is a circular carriage 270 which, like the frame 216, is adapted to encircle trunk 12. At a pin 272, the carriage 270 can be released and opened pivoting about hinge 274 to receive trunk 12 therein, as shown in FIG. 7. When the frame 216 has been positioned about the trunk 12, carriage 270 is also reconnected so as to encircle trunk 12.

The carriage 270 rests on wheels 276 journaled at quarter points on the top support 218. The carriage 270, when rotated as described below, rotates the top of the wheels 276.

To further guide and support the carriage 270 for rotation, the device 210 includes guide wheels 282a-j distributed so as to bear against the inside surface of the carriage 270 as shown in FIG. 7. Two of the guide wheels shown as guide wheels 282b and 282i are connected to the top support 218 whereas guide wheels 282a and 282j are connected to corner supports 284 disposed across top support 218 at the corners thereof. As stated above, the guide rollers 282a-j bear against the inside surface of the carriage 270 to guide and support its rotation and prevent forward-to-rear or side-to-side translation during the operation of the device 210. As best shown in FIG. 7, carriage 270 below the guide wheels 282a-j, and engages the same to prevent upward movement of the carriage 270 relative to the frame 216. As described above, downward relative movement is prevented by the wheels 276. As can be appreciated, the wheels 276 and guide wheels 282a-j guide and journal the carriage for rotation about the trunk 12 of the tree.

To rotate the carriage 270, mounting plate 235 mounts electric motor 288 which may be of any suitable type, including a heavy duty electric drill-type motor. Motor 288 has a shaft 290 to which is keyed to two sheaves 292. Sheaves 292 engage tow belts 294 which are wrapped about the carriage 270 and received at an appropriate track 296 thereof as indicated in FIG. 5. Accordingly, when the motor 288 is energized, the sheaves 292 rotate driving belts 294 which, in turn, rotate the carriage 270. Sheaves 292 retain the belts 294 in proper alignment and coupled with the carriage 270 during the drive rotation thereof. Guide wheels 282a-j support the carriage 270 to permit the endless belts 294 to be tensioned. To adjust the tension of the belt 294, motor 288 may be mounted on adjustable mounts 298 to permit its adjustable movement toward and away from mounting plate 235.

To trim the frond segments 14 from the tree as a result of the rotation of the carriage 270, blade member 300a is attached for translational movement and blade members 300b and 300c are attached for translational and rotational movement with respect to semicircular frames 271a and 271b, respectively, which in turn are rigidly attached to the carriage 270. As shown, blade member 300a is attached to semicircular frame 271a at three points by bolts 301a, 301b and 301c. Slots 302a, 302b and 302c in blade 300a slide past bolts 301a, 301b and 301c. Blade member 300a's movement is biased towards translational frame 273 by springs 280a and 280b. Additional biasing means shown as springs 304a and 304b are interconnected between blade member 300a and blade members 300b and 300c. All the springs collectively provide a bias against the collars 14 of the tree as indicated in FIG. 6. That is, springs 280a, 280b, 304a and 304b urge blade members 300a, 300b and 300c to move toward the center of carriage 270.

To define cutting edges for blade members 300a, 300b and 300c, a plurality of blades 308 are mounted thereon medially of blade member 300a. Adjusting bolts 310 which secure blades 308 to blade members 300a, 300b and 300c provides for adjustment and replacement of blades 308.

Blade member 300b is attached to translational frame 273 at two points by bolts 310 and 312. Translational frame 273 is attached to semicircular frame 271b at three points by bolts 306a, 306b and 306c. The translational frame 273's movement is constrained by the slots 308a, 308b and 308c which slide past bolts 306a, 306b and 306c in semicircular frame 271b. The translational frame 273 is biased toward blade member 300a by biasing springs 280a and 280b. In addition to the movement provided by translational frame 273, blade member 300b pivots about bolt 310 while slot 316 slides past bolt 312. Blade member 300b is biased towards blade member 300a by biasing spring 304a.

Blade member 300c is attached to translational frame 273 at two points by bolts 318 and 320. Blade member 300c moves with the translational frame 273 and additionally pivots about bolt 320 while slot 316 slides past bolt 318.

As can be appreciated with particular reference to FIG. 6, the blade members 300a, 300b and 300c are adapted for movement toward and away from the center of the device 210 and its rotating carriage 270. As carriage 270 rotates, blade member 300a, is free to translate and blade members 300b and 300c are free to translate and pivot against the bias of springs 280a, 280b, 304a and 304b to maintain blades 308 in engagement with the trunk 12 of the tree. As the diameter of the tree changes, blade members 300a, 300b and 300c cooperatively translate and pivot accommodating such change to remove the frond segments 14 therefrom.

Based upon the foregoing, the device 210 is initially attached to the trunk 12 of the tree in the manner described above. Wing nuts 266 are adjusted to trap the trunk of the tree between rollers 260 and wheel pairs 232. Motor 236 is energized as is motor 288, causing the device 210 to begin to ascend the tree as carriage 270 rotates. Rotation of carriage 270 causes blades 308 to sever collars 14 from the tree as the device 210 progressively moves upwardly along trunk 12. When fronds 14 have been severed along the length of the tree, motor 236 is reversely driven so that the device descends to the bottom of the tree where both motors 236 and 288 are de-energized and the device 210 is removed from the tree.

While I have shown and described certain embodiments of the present invention, it is to be understood that it is subject to many modifications without departing from the spirit and scope of the claims set forth herein.

What is claimed is:

1. A device for trimming and smoothing a tree trunk comprising:
   a frame positionable about the trunk;
   means disposed on the frame for engaging the trunk and driving the frame upwardly and downwardly along said trunk;
   a generally circular carriage rotatably mounted on the frame to encircle the trunk;
   means for rotating the carriage about the trunk;
   trimming means for easily engaging branch segments from the tree trunk, including first and second arm members horizontally mounted on opposite sides of the carriage so as to form chords of a circle defined by the carriage and to bracket the trunk therebetween;
   a plurality of cutting means mounted on each of said first and second arm members, said cutting means being positioned to engage the trunk when said arms are pivoted into operating position adjacent the trunk; and
   means for urging the arm members inward to engage the tree trunk, rotation of the carriage causing the cutting means to trim branch segments from the trunk of the tree to produce a clean, relatively smooth surface, wherein the urging means comprise spring biasing means for causing the arm members to pivot in an articulating manner toward and away from each other as the tree trunk increases or decreases in diameter.

2. The device of claim 1 wherein the spring biasing means are coil springs interconnected between the carriage and the ends of the arm members.

3. The device of claim 1 wherein the rotating means includes an electric motor disposed on the frame and a belt coupling the carriage to the motor, energization of the motor driving the belt to rotate the carriage.

4. A device for trimming and smoothing a tree trunk comprising:
   a frame positionable about the trunk;
   means disposed on the frame for engaging the trunk and driving the frame upwardly and downwardly along said trunk;
   carriage disposed on the frame to encircle the trunk;
   means for rotating the carriage about the trunk;
   trimming means for easily engaging branch segments from the tree trunk, including a first and second arm member pivotally mounted on opposite sides of the carriage so as to bracket the trunk therebetween; and
   a plurality of cutting means mounted on each of said first and second arm members, said cutting means being positioned to engage the trunk when said arms are pivoted into operating position adjacent the trunk; and
   means for urging the cutting means to engage the tree trunk, rotation of the carriage causing the cutting means to trim branch segments from the trunk of the tree to produce a clean, relatively smooth surface;
   wherein the urging means includes spring biasing means for causing the arm members to pivot in an articulating manner toward and away from each other as the tree trunk increases or decreases in diameter; and
   wherein said arm members are free at one end and pivotally attached to each other at their opposite ends such that first and second arm members articulate relative to a tree trunk positioned between said members.

5. A device for trimming and smoothing tree trunks after the branches have been removed;
   a frame positionable about the trunk;
   means disposed on the frame for engaging the trunk and driving the frame upwardly and downwardly along said trunk;
   a carriage supported for rotation on the frame to encircle the trunk;
   means for rotating the carriage about the trunk;
   trimming means including at least one pair of arm members disposed horizontally on the carriage in an opposed relationship, locating the trunk therebetween, said arm members each having a first end pivotally attached to the carriage and having a second opposite free end such that the first and second arm members articulate relative to the tree trunk positioned between said members; and
   means coupled between said free ends and carriage to urge said trimming means to maintain contact with said trunk, rotation of the carriage causing the trimming means to trim branch segments from the trunk.

* * * * *